United States Patent
Le Sauze et al.

(10) Patent No.: US 6,690,891 B1
(45) Date of Patent: Feb. 10, 2004

(54) METHOD FOR SYNCHRONIZING OPTICAL SIGNALS, AN OPTICAL SYNCHRONIZING DEVICES AND AN OPTICAL NETWORK NODE THEREFOR

(75) Inventors: Nicolas Le Sauze, Chaville (FR); Dominique Chiaroni, Antony (FR); An Ge, Plano, TX (US); Amaury Jourdan, Sèvres (FR)

(73) Assignee: Alcatel, Paris (FR)

( * ) Notice: Subject to any disclaimer, the term of this patent is extended or adjusted under 35 U.S.C. 154(b) by 535 days.

(21) Appl. No.: 09/678,097

(22) Filed: Oct. 4, 2000

(51) Int. Cl.$^7$ ................................................ H04B 10/00
(52) U.S. Cl. ..................... 398/154; 398/45; 398/102; 398/161; 250/227.12
(58) Field of Search ..................... 398/53–54, 45, 398/102, 154, 161; 250/227.12

(56) References Cited

U.S. PATENT DOCUMENTS

| | | | | |
|---|---|---|---|---|
| 4,677,618 A | * | 6/1987 | Haas et al. ................. | 714/700 |
| 5,469,284 A | * | 11/1995 | Haas ........................... | 398/54 |
| 5,526,156 A | * | 6/1996 | Bostica et al. ................ | 398/54 |
| 6,144,786 A | * | 11/2000 | Chethik ........................ | 385/24 |

* cited by examiner

*Primary Examiner*—Kinfe-Michael Negash
(74) *Attorney, Agent, or Firm*—Sughrue Mion, PLLC

(57) ABSTRACT

A method for synchronizing optical signals conducted via different optical waveguides to an optical network node, wherein the variations in propagation time of the optical signals are compensated by adjustable optical delay circuits of a synchronizing device. To set a new delay for one of the optical waveguides, one of the adjustable delay circuits, already switched into the passive state, is set at the desired delay. This delay circuit is then switched into the active state by means of a high-speed optical switch, and the previously active delay circuit is switched into a passive state.

20 Claims, 2 Drawing Sheets

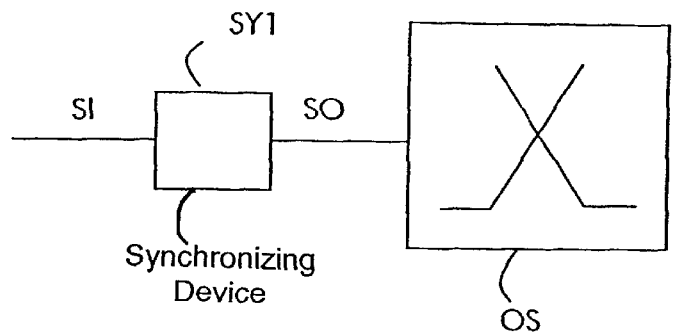
Fig.1
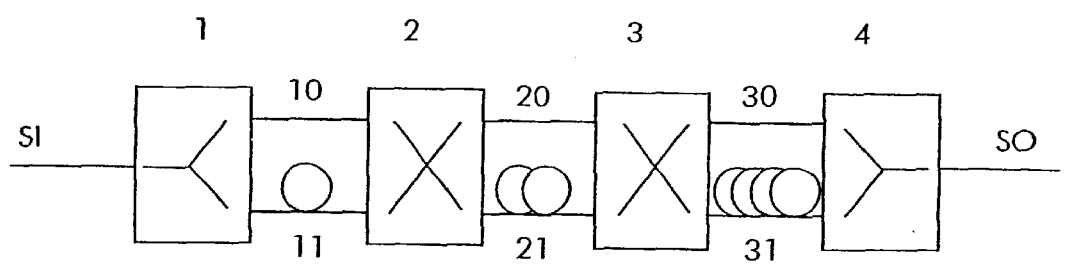
PRIOR ART  Fig.2
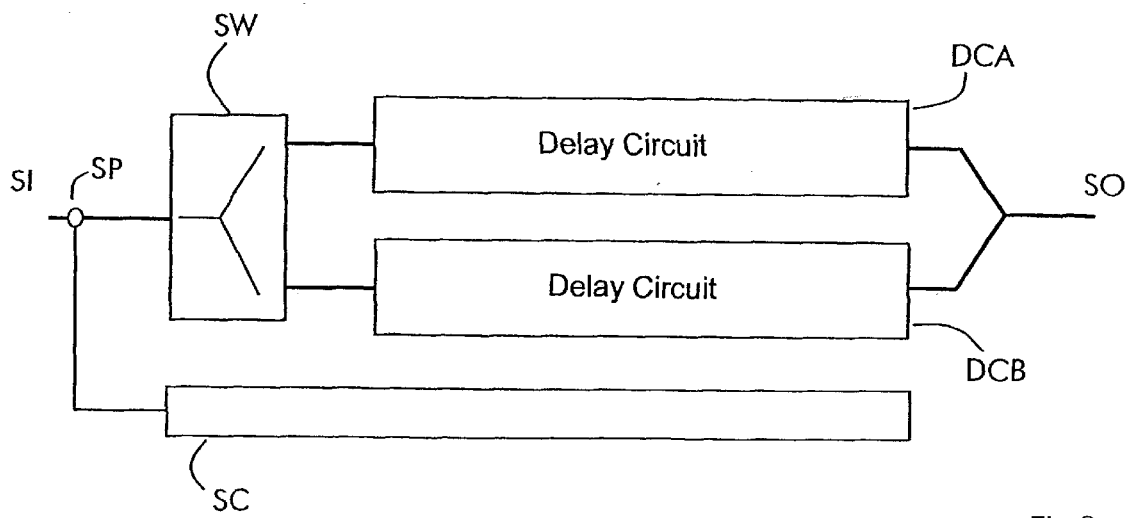
Fig.3

METHOD FOR SYNCHRONIZING OPTICAL SIGNALS, AN OPTICAL SYNCHRONIZING DEVICES AND AN OPTICAL NETWORK NODE THEREFOR

BACKGROUND OF THE INVENTION

The invention relates to a method for synchronizing optical signals conducted via different optical waveguides to an optical network node, wherein variations in propagation time of the optical signals are compensated by at least two adjustable optical delay circuits, an optical synchronizing device for implementing an adjustable delay for the optical signals of an optical waveguide, an optical synchronizing device for implementing adjustable delays for the optical signals of a plurality of optical waveguides and an optical network node comprising at least one synchronizing device.

Present-day communications transmission technology is characterized by two main directions of development. The first development direction leads from electrical transmission devices to optical transmission devices and encompasses the construction of increasingly complex network nodes, for example multiplex devices or switching devices, such as to obviate the need for the conversion of the optical signals into electrical signals. The second development direction leads from continuous data signals to packet-oriented data signals. Whereas, at least in commercial systems, packet or cell switching currently is still performed exclusively for electrical signals, high-speed optical networks with optical packet switching are already being successfully implemented in research projects, such as for example the research project "Keys to Optical Packet Switching" (KEOPS) promoted by the European Community and referred to in the following as KEOPS project. The main network elements of such an (optical) network are represented by (optical) packet switching nodes, the function of which is to identify the packets contained in the received (optical) signals, analyze their control information, and forward the packets to further (optical) network nodes in accordance with their control information. To ensure a simple and effective switching of the packets, the signals which are transmitted via different optical waveguides and brought to the packet switching node must be synchronized. For this purpose the packet switching node is preceded by a synchronizing device which contains an adjustable delay circuit for each optical waveguide. Here a delay circuit consists for example of a cascade of optical switches by means of which different individual delay elements or delay lines, i.e. optical waveguides of a specific length, are connected to form a resultant delay line leading to a specific delay of the optical signal conducted across the delay circuit.

The synchronization fundamentally takes place in two different phases. In a first phase prior to the operation of the network, the so-called start-up phase, a basic setting takes place, in the following also referred to as static synchronization, which compensates for the different lengths of the optical waveguides. As the switch-over behavior of the optical switches is non-critical in this phase, slow optical switches can be used to set a corresponding delay circuit. In a second phase, the so-called operating phase, propagation time changes which occur during operation are compensated by a so-called dynamic synchronization. These propagation time changes or propagation time variations are caused in particular by thermal effects. As soon as a specific change in the propagation time of an optical waveguide is measured through the identification of the synchronization patterns in the signals, the corresponding delay is adapted by a new interconnection of delay elements. Here the transmission of the optical signals should not be disturbed such as to lead to the destruction of one or more optical packets. Therefore a switch-over from one delay value to another should only take place in short, defined time pauses, the so-called guard time, and must be completed within this time; the switches used must therefore possess a switching time which is shorter than the said guard time.

As on the one hand large delay variations must be compensated, but on the other hand a high resolution is also required, a specific number of delay lines must be able to be connected by means of a cascade of optical switches. Here an optical signal passes through all of these switches. Depending upon the switch technology, each optical switch gives rise either to a specific loss of optical power or, in the case of switches with integrated optical amplifiers, an increase in noise power. In this way, for example in the case of so-called semiconductor optical amplifier (SOA) gates, a critical reduction in the optical signal/noise ratio (OSNR) can occur through the series connection of a larger number of the switches. However, due to the required fast switching time it is not possible to use virtually loss-free switches, for example micro-electronic mirrors (MEM).

SUMMARY OF THE INVENTION

Commencing from a method of the above described type, the object of the invention is to indicate a means whereby the required number of high-speed optical switches of a synchronizing is device can be reduced to a minimum.

This object is achieved in accordance with the invention by a method for synchronizing optical signals conducted via different optical waveguides to an optical network node, wherein variations in propagation time of the optical signals are compensated by at least two adjustable optical delay circuits, an optical synchronizing device for implementing an adjustable delay for the optical signals of an optical waveguide, an optical synchronizing device or implementing adjustable delays for the optical signals of a plurality of optical waveguides, and an optical network node comprising at least one synchronizing device.

Apart from possibly occurring jitter effects, in particular limited propagation time variations occurring in the packet timing, the above described propagation time variations have a relatively slow temporal course. The jitter effects are compensated by special fast synchronization devices which will not be considered in detail here. The remaining slow propagation time variations thus do not require frequent switching over of the corresponding synchronizing device. The basic concept of the invention is to set the delay of an initially passive delay circuit (off-line), for which purpose a relatively large amount of time is available. Then this delay circuit is switched into the active state. A delay circuit according to the invention can thus in principle be constructed from two delay circuits each comprising only slow optical switches which are switched over by a high-speed optical switch. Only this switch-over process needs to take place with a fast switching time within the above mentioned guard time.

An advantageous embodiment of the invention consists in that a synchronizing device for a specific number of optical waveguides (e.g. four) comprises a total number of slowly adjustable delay circuits increased by one (e.g. five). Here the additional delay circuit compared to the number of optical waveguides is switched passive in its basic state and is switched active only for the setting of a new delay for an optical waveguide.

Further developments of the invention can be gathered from the dependent claims and the following description.

BRIEF DESCRIPTION OF THE DRAWINGS

In the following the invention will be further explained making reference to the attached drawings in which:

FIG. 1 illustrates an example of an optical network node of an optical packet network preceded by a synchronizing device, FIG. 2 illustrates an example of a structure of a delay circuit according to the prior art, FIG. 3 illustrates a synchronizing device according to the invention and FIG. 4 illustrates a further development of a synchronizing device according to the invention.

DETAILED DESCRIPTION OF THE INVENTION

Figure 4:
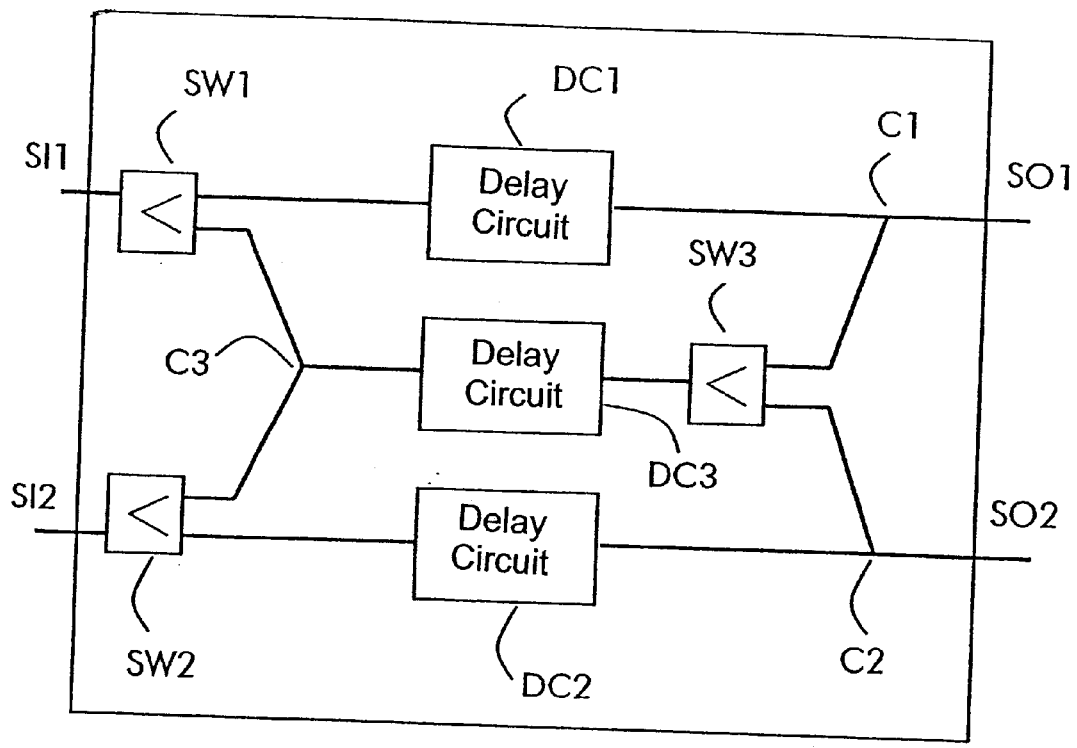

FIG. 1 shows a synchronizing device SY1 with one (optical) input S1 and one (optical) output SO which is connected to an input of an optical network node OS.

An optical signal here comprises a sequence of optical packets. An optical packet consists of a specific number of light pulses of a specific wavelength which for example each assume two different amplitude values representing the logical values "1" or "0". Here a packet consists of a header and a payload. The header contains for example routing- and synchronizing information. The optical network node OS has the function of switching optical packets incoming on different optical waveguides to specific optical outputs on the basis of the routing information. In a wavelength division multiplex (WDM) transmission system, it is also possible to simultaneously transmit a plurality of optical signals of different wavelengths which in the optical network node OS are optionally converted into signals of different wavelengths by means of wavelength converters.

The synchronizing device SY1, shown here for example for an optical waveguide, serves to synchronize the optical packets incoming at the optical network node OS. A synchronizing device according to the prior art generally consists of one delay circuit for each optical waveguide. The delay circuits are used for the static compensation of, on the one hand, the different lengths of the different optical waveguides and, on the other hand, dynamic variations in the propagation times of the optical signals on the optical waveguides, which variations occur due to thermal effects. For this purpose a monitoring unit of the synchronizing device SY1 analyzes the synchronizing information contained in the packets, compares this information with a given time signal, and initiates the correct setting of the corresponding delay circuits.

The following FIG. 2 illustrates an example of a possible structure of a delay circuit according to the prior art of the synchronizing device SY1 shown in FIG. 1. Here by way of simplification, a small number of only four (optical) switches 1, 2, 3 and 4 has been shown. The first switch 1 is a 1×2 switch with one input and two outputs. The following switches 2 and 3 are 2×2 switches each with two inputs and two outputs. The last, in this case fourth, switch 4 is a 2×1 switch with two inputs and one output. The input of the first switch 1 constitutes the input S1 shown in FIG. 1. The two outputs of the first switch 1 are connected to the inputs of the second switch 2 via a first short link 10 and a first delay line 11. The two outputs of the second switch 2 are connected to the inputs of the third switch 3 via a second short link 20 and a second delay line 21. The two outputs of the third switch 3 are connected via a third short link 30 and a third delay line 31 to the inputs of the fourth switch 4 whose output constitutes the output SO shown in FIG. 1. Whereas the delay of a signal via the short links 10, 20 and 30 is so small that these links can be considered as having no delay, the delay lines 11, 21 and 31 represent optical waveguides of specific lengths which each delay the optical signal by a defined time. The delay time of the third delay line 31 here is exactly double that of the second delay line 21 and exactly four times that of the first delay line 11. In the arrangement shown here, eight different delay values can be set, which are operative depending upon the position of the switches 1, 2, 3 and 4. If all the switches are set such that only the short optical links 10, 20 and 30 are operative, only a negligible delay occurs for an optical signal passing through the entire switch cascade. If all the switches are set such that the delay lines 11, 21 and 31 are operative, the maximum adjustable signal delay occurs. If for example the delay of the first delay line 11 amounts to 10 nanoseconds (ns), a total signal delay of 70 nanoseconds occurs. Between the minimum delay of approximately 0 nanoseconds and the maximum delay of 70 nanoseconds, all the delay values can be set in steps of 10 nanoseconds. In the case of the illustrated three-step switch cascade comprising 4 switches, it is thus possible to set a total of eight different delays. The fourth switch 4 can optionally also have the form of a simple optical coupler. The actual delays of the short links 10, 20 and 30 can be compensated by selecting the same length for each of the short links 10, 20 and 30 and extending each of the delay lines 11, 21 and 31 by this length beyond the described lengths.

In large optical networks with transmission ranges of for example 1000 km. and a temperature variation up to for example 60°, variations of the signal propagation times of up to 6 microseconds occur: If this propagation time variation is to be compensated with a resolution of for example 10 nanoseconds in the synchronizing circuit SY, 600 different setting options must be provided. It is thus possible to set delay times in steps of 10 nanoseconds in the range of 0 to 6 microseconds. This requires at least 11 switches, or 10 switches if the last switch has the form of an optical coupler. Multi-step switches, for example 4×4 switches with four inputs and outputs can also be used. It is thus possible to reduce the number of switches compared to 2×2 switches with the same number of different setting options; however the switches become correspondingly more costly and a larger number of delay lines with an overall longer length are required. Although variations in propagation time due to temperature changes have relatively large time constants, the delay circuit described here must be equipped with high-speed switches which facilitate a switch-over within the above described guard time between two optical packets. Thus in the above mentioned KEOPS project a guard time of a minimum of 26 nanoseconds was provided. As these switches are connected in series, a larger number of switches, for example the above mentioned 10 switches, can lead to a critical reduction in the optical signal/noise ratio.

In principle, a synchronizing circuit could be constructed such that a high-speed optical switch selects a suitable delay from a number of permanently set delay lines. However, this would result in the need to provide an unacceptably large number of delay lines. The concept of the invention is to use only one high-speed optical switch which switches between two adjustable delay lines implemented for example by delay circuits of the above mentioned structure but only using slow switches. Prior to the switch-over from one delay circuit to the other, the currently passive delay circuit is set at the desired delay before it is switched into the operative or active state. There is always sufficient time available for this purpose since, as described above, propagation time changes of the optical waveguides have relatively large time constants.

FIG. 3 illustrates a synchronizing device according to the invention, for example for an optical waveguide, with a high-speed switch SW, a delay circuit DCA and an additional delay circuit DCB. The delay circuits DCA and DCB are identical and for example have the structure illustrated in FIG. 2, but here using only slow switches. The high-speed switch SW switches the input signal received at its input S1 to one of the said delay circuits DCA or DCB, the outputs of which are interconnected by an optical coupler and form the output SO which is connected to the optical network node OS in FIG. 1. Generally, the device for the correction of the jitter effects (already known, not described here) is placed between the synchronizing device that compensates for these slow variations and the optical network node OS. The output SO of the synchronizing device is connected (optionally through an optical amplifier to compensate for the losses of the synchronizing device) to an optical demultiplexer and each optical signal is then treated by a device correcting the jitter effects. Additionally, an optical splitter SP has been shown by which the optical signal incoming at the input S1 is tapped and fed to an (opto-electronic) monitoring unit SC. The monitoring unit SC detects the synchronizing information contained in the packets of the optical signal and by comparing this with a given time signal determines the required delay. This required delay is compared with the set delay of the delay circuit DCA or DCB which has been switched into the operative i.e. active state. If the set delay of the active delay circuit deviates by more than a specific threshold value from the determined required delay, the monitoring unit SC firstly initiates the setting of the delay circuit DCA or DCB which is currently not operative, i.e. is passive, at the required delay and then initiates the switch-over of the high-speed switch SW, whereby the previously active delay circuit becomes passive and the previously passive delay circuit becomes active. Whereas the setting of the required delay can take place some time prior to the switch-over and thus is not time-critical, the switch-over of the delay circuits DCA and DCB by the high-speed switch SW must take place within the above described short guard times. If, optionally, a further switch is used instead of the described optical coupler at the output of the two delay circuits DCA and DCB, this switch must likewise have the form of a high-speed switch. The synchronizing device can also be realized interchanging the optical coupler and the high speed switch SW: the coupler at the input sends the optical signals to both delay circuits DCA and DCB, and then, at the output of the two delay circuits DCA and DCB, the high-speed switch SW activates one of these delay circuit DCA or DCB.

A disadvantage of the synchronizing device according to the invention would initially appear to reside in the doubling of the number of required switches. However, apart from the high-speed switch SW, it is possible to use slow switches, for example of a higher optical quality, or cheaper switches compared to the high-speed switches according to the prior art.

Another advantageous embodiment illustrated in FIG. 4 provides a reduction in switches of a synchronizing device SY, in the case of which only n+1 slow-switching delay circuits are required for a number of n optical waveguides to be synchronized. Here a synchronizing device SY is shown for example for two optical waveguides. The synchronizing device SY comprises a first (optical) input S11 and a second (optical) input S12 as well as a first (optical) output SO1 and a second (optical) output SO2. It comprises a first (optical) switch SW1, a second (optical) switch SW2, a third (optical) switch SW3, a first delay circuit DC1, a second delay circuit DC2, a third delay circuit DC3, a first (optical) coupler C1, a second (optical) coupler C2 and a third (optical) coupler C3. All the switches SW1, SW2 and SW3 represent 1×2 switches, each with one input and two outputs. The first input S11 leads to the input of the first switch SW1 whose outputs are connected to the input of the first delay circuit DC1 and, via the third coupler C3, to the input of the third delay circuit DC3. The second input S12 leads to the input of the second switch SW2 whose outputs are connected to the input of the second delay circuit DC2 and, via the said third coupler C3, likewise to the input of the third delay circuit DC3. The output of the first delay circuit DC1 leads via the first coupler C1 to the first output SO1 of the synchronizing device SY. The output of the second delay circuit DC2 leads via the second coupler C2 to the second output SO2 of the synchronizing device SY. The output of the third delay circuit DC3 leads to the third switch SW3 whose outputs lead via the first coupler C1 to the first output SO1 and via the second coupler C2 to the second output SO2 of the synchronizing device SY.

Each optical waveguide is initially assigned a delay circuit DC1 and DC2 respectively. Additionally, a further delay circuit DC3 is provided which initially is not assigned to any optical waveguide and in the basic state is switched passive i.e. is not supplied with an optical signal. It is sufficient for all the said delay circuits to be equipped with slow optical switches. For all the optical waveguides, a monitoring device SC (shown in FIG. 3) checks whether the set delays of the corresponding active delay circuits DC1 and DC2 correspond to the determined desired delays. If a delay, for example of the first delay circuit DC1, differs from the desired delay by more than a specific threshold value, a process for the readjustment of the first delay circuit DC1 takes place in the following steps:

the passive, third delay circuit DC3 is set at the desired delay and the switch SW3 is set such that the output of the third delay circuit DC3 is optically connected to the first output SO1, the first switch SW1 is switched over so that the third delay circuit DC3 becomes active and at the same time the first delay circuit DC1 becomes passive, the first delay circuit DC1 is likewise set at the desired delay and the first switch SW1 is switched over again so that the first delay circuit DC1 becomes active again and at the same time the third delay circuit DC3 becomes passive again.

A corresponding process takes place for the readjustment of the second delay circuit DC2. The third delay circuit DC3 thus is always only transitionally switched active. Whereas the third switch SW3 can have the form of a slow switch, (only) the first switch SW1 and the second switch SW2 need be in the form of high-speed switches as the switch-over process to be performed by these switches must take place within the said guard times. Alternatively, it is also possible to use switches instead of the couplers C1, C2 and C3, in which case the switches replacing the first coupler C1 and the second coupler C2 must likewise be in the form of high-speed switches. It is also possible to interchange the positions of the coupler C1 and the high-speed switch Swi (C1 and SW1, C2 and SW2, C3 and SW3).

For a synchronizing device for more than two optical waveguides, the third coupler C3 has a number of inputs corresponding to the number of optical waveguide inputs, and the third switch SW3 has the same number of outputs.

What is claimed is:

1. A method for synchronizing optical signals conducted via different optical waveguides to an optical network node, wherein variations in propagation time of the optical signals are compensated by at least two adjustable optical delay circuits, one of the adjustable circuits being in an active state and the other adjustable circuit being in a passive state, wherein for the setting of a desired delay for a specific optical waveguide, the method comprises:

setting the adjustable delay circuit in the passive state to the desired delay, and switching the adjustable delay circuit with the desired delay from the passive state to the active state by means of a high-speed optical switch and switching the previously active adjustable delay circuit into the passive state.

2. A method according to claim 1, wherein for the setting of the desired delay of the adjustable delay circuit, different optical delay lines are connected in series by optical switches.

3. An optical synchronizing device for implementing an adjustable delay for the optical signals of an optical waveguide comprising:

two adjustable delay circuits, each of which can be selectively switched into an active or a passive state, a high-speed optical switch for switching from one of the delay circuits to the other of the delay circuits within a defined time, and control means for determining a desired delay, for setting one of the delay circuits, which has been switched into the passive state, at the desired delay, and for activating the delay circuit with the desired delay by switching the high-speed switch.

4. An optical network node with an integrated synchronizing device, wherein the integrated synchronizing device comprises a plurality of synchronizing devices according to claim 3.

5. An optical synchronizing device according to claim 3, further comprising an optical coupler, wherein the high-speed optical switch receives the optical signals and the optical coupler couples an output from each adjustable delay circuit to create an output optical signal.

6. An optical synchronizing device according to claim 3, further comprising an optical coupler, wherein the optical coupler receives the optical signals and the high-speed optical switch selects between an output from each adjustable delay circuit to create an output optical signal.

7. An optical synchronizing device according to claim 3, wherein the control means determines the desired delay by detecting synchronization information contained in the optical signals.

8. An optical synchronizing device for implementing adjustable delays for the optical signals of a plurality of optical waveguides comprising:

a respective delay circuit or each optical waveguide, a respective high-speed optical switch for each optical waveguide, a transitional delay circuit and an optical switch for switching over between the respective delay circuit assigned to an optical waveguide and the transitional delay circuit, control means for the setting of the respective delay circuit assigned to an optical waveguide selected from the plurality of waveguides, wherein the control means sets the transitional delay circuit at a desired delay, activates the transitional delay circuit and switches the respective delay circuit of the selected optical waveguide into a passive state, sets the respective delay circuit of the selected optical waveguide, which has been switched into the passive state, at the desired delay, and activates the respective delay circuit of the selected optical waveguide and switches the transitional delay circuit into the passive state.

9. An optical network node with an integrated synchronizing device, wherein the integrated synchronizing device comprises at least one synchronizing device according to claim 8.

10. An optical synchronizing device according to claim 8, further comprising a respective optical coupler for each optical waveguide, wherein the respective high-speed optical switch for an optical waveguide from the plurality of optical waveguides receives an optical signal that is switched between the respective delay circuit for the optical waveguide and the transitional delay circuit, and the respective optical coupler couples an output from the respective delay circuit and an output from the transitional delay circuit to create an output optical signal.

11. An optical synchronizing device according to claim 8, further comprising a respective optical coupler for each optical waveguide, wherein the respective optical coupler for an optical waveguide from the plurality of optical waveguides receives an optical signal that is coupled to the respective delay circuit for the optical waveguide and the transitional delay circuit, and the respective high-speed optical switch switches between an output from the respective delay circuit and an output from the transitional delay circuit to create an output optical signal.

12. An optical synchronizing device according to claim 8, wherein the control means determines the desired delay by detecting synchronization information contained in the optical signals.

13. An optical synchronizing device for implementing an adjustable delay for the optical signals of an optical waveguide comprising:

two adjustable delay circuits, each of which can be selectively switched into an active or a passive state, a high-speed optical switch for switching from one of the delay circuits to the other of the delay circuits within a defined time, and an opto-electronic monitoring unit for determining a desired delay, for setting one of the delay circuits, which has been switched into the passive state, at the desired delay, and for activating the delay circuit with the desired delay by switching the high-speed switch.

14. An optical synchronizing device according to claim 13, further comprising an optical coupler, wherein the high-speed optical switch receives the optical signals and the optical coupler couples an output from each adjustable delay circuit to create an output optical signal.

15. An optical synchronizing device according to claim 13, further comprising an optical coupler, wherein the optical coupler receives the optical signals and the high-speed optical switch selects between an output from each adjustable delay circuit to create an output optical signal.

16. An optical synchronizing device according to claim 13, wherein the opto-electronic monitoring unit determines the desired delay by detecting synchronization information contained in the optical signals.

17. An optical synchronizing device for implementing adjustable delays for the optical signals of a plurality of optical waveguides comprising:

a respective delay circuit for each optical waveguide, a respective high-speed optical switch for each optical waveguide, a transitional delay circuit and an optical switch for switching over between the respective delay circuit assigned to an optical waveguide and the transitional delay circuit, an opto-electronic monitoring unit for the setting of the respective delay circuit assigned to an optical waveguide selected from the plurality of waveguides, wherein the control means sets the transitional delay circuit at a desired delay, activates the transitional delay circuit and switches the respective delay circuit of the selected optical waveguide into a passive state, sets the respective delay circuit of the selected optical waveguide, which has been switched into the passive state, at the desired delay, and activates the respective delay circuit of the selected optical waveguide and switches the transitional delay circuit into the passive state.

18. An optical synchronizing device according to claim 17, further comprising a respective optical coupler for each optical waveguide, wherein the respective high-speed optical switch for an optical waveguide from the plurality of optical waveguides receives an optical signal that is switched between the respective delay circuit for the optical waveguide and the transitional delay circuit, and the respective optical coupler couples an output from the respective delay circuit and an output from the transitional delay circuit to create an output optical signal.

19. An optical synchronizing device according to claim 17, further comprising a respective optical coupler for each optical waveguide, wherein the respective optical coupler for an optical waveguide from the plurality of optical waveguides receives an optical signal that is coupled to the respective delay circuit for the optical waveguide and the transitional delay circuit, and the respective high-speed optical switch switches between an output from the respective delay circuit and an output from the transitional delay circuit to create an output optical signal.

20. An optical synchronizing device according to claim 17, wherein the control means determines the desired delay by detecting synchronization information contained in the optical signals.

\* \* \* \* \*